2,716,087

METHOD OF FILTERING DISPERSIONS OF METAL OXIDES AND HYDROXIDES IN LUBRICATING OILS

Richard L. Woodruff, Concord, Paul K. Mulvany, Richmond, and James O. Clayton, Berkeley, Calif., assignors to California Research Corporation, San Francisco, Calif., a corporation of Delaware No Drawing. Application March 29, 1951,
Serial No. 218,284

5 Claims. (Cl. 252—18)

This invention pertains to a method of increasing the rate of filtration during the prepartion of lubricating oil compositions containing polyvalent metal oxides and hydroxides (e. g., calcium oxide and calcium hydroxide) dispersed therein.

During the operation of internal combustion engines, acids which are formed in the lubricating oil are the result of oxidation of the lubricating oil itself during engine operation, and the blow-by combustion products of the fuel. These acids catalyze the breakdown of the lubricating oil and contribute to wear by corrosion.

Polyvalent metal oxides and hydroxides effectively neutralize the acids thus formed during the operation of internal combustion engines. The use of polyvalent metal oxides and hydroxides in lubricating oils for this purpose is a considerably less expensive method of neutralizing these acids than the use of organic materials such as calcium cetyl phenate. Furthermore, these inorganic materials neutralize larger amounts of acids per unit weight than organic compounds.

As taught by Lindstrom and Woodruff in patent applications Serial Nos. 203,782, now abandoned, and 203,783, now Patent No. 2,676,925, colloidal dispersions (colloidal solutions) of polyvalent metal oxides and hydroxides in lubricating oils can be obtained by the use of dihydric alcohols, e. g., ethylene glycol. The polyvalent metal oxides and hydroxides are dissolved (or dispersed) in a dihydric alcohol. The dihydric alcohol solutions (or dispersions) are then thoroughly blended with lubricating oils to form dispersions of polyvalent metal oxides or hydroxides, which dispersions are stabilized by dispersants (e. g., polyvalent metal sulfonates, sulfates, phosphates, thiophosphates, phosphonates, thiophosphonates, naphthenates, carboxylates, etc.). The dihydric alcohol is removed by distillation, and the mixture is filtered to remove undispersed polyvalent metal oxides of hydroxides. The filtration step oftentimes is slow and cumbersome, requiring considerable time.

It is an object of this invention to provide a method of improving the filtration rate in the preparing of dispersions of metal oxides and hydroxides in lubricating oils.

It is a further object of this invention to set forth a method for facilitating the filtration of dispersions of polyvalent metal oxides and hydroxides in lubricating oil prepared by the use of a dihydric alcohol.

These and other objects of this invention will be apparent from the ensuing description and the appended claims.

It has been discovered that the filtration step in the preparation of lubricating oil compositions containing colloidal dispersions (colloidal solutions) of polyvalent metal oxides and hydroxides can be facilitated by the use of a filtering agent selected from the group consisting of alpha hydroxy acids, polyvalent metal salts (particularly calcium salts) of alpha hydroxy acids, and mixtures thereof.

The alpha hydroxy acids which can be used according to this invention include glycolic acid and lactic acid.

Instead of alpha hydroxy acids themselves, polyvalent metal salts (particularly the calcium salts) of the alpha hydroxy acids can be used, or mixtures thereof.

The amount of alpha hydroxy acids or the calcium salts thereof desired for the filtration is dependent on the amount of polyvalent metal oxides or hydroxides dispersed in the lubricating oils. The mol ratio of alpha hydroxy acids (or the calcium salts thereof) to the calcium oxide (or hydroxide) dispersed in the oil can vary from about 0.1 to about 4.0. It is desired that the amount of alpha hydroxy acid added be such that no free acid is present in the finished composition. The addition of too large amounts of the calcium salts of alpha hydroxy acids tends to thicken the lubricating oil composition to the consistency of a grease.

Although no theory is set forth herein to explain the phenomenon of this invention, it is believed that the agents used as filtration aids inhibit the formation of a gel-like substance which slows down the filtration rate. The method set forth herein can be used whenever filtration is impeded by gel-like substance resulting from dispersions of polyvalent metal oxides or hydroxides in lubricating oils.

Examples I to IV, inclusive, and the examples of Table I hereinbelow illustrate the methods of dispersing and stabilizing dispersions of polyvalent metal oxides and hydroxides in lubricating oils, as set forth by Lindstrom and Woodruff patent applications Serial Nos. 203,782 and 203,783. Further exemplified is the use of alpha hydroxy acids to facilitate the filtration according to the present invention. (Examples I and II illustrate the preparation of calcium sulfonates which were used to stabilize the colloidal dispersions of calcium oxides.)

*Example I.—Preparation of calcium mahogany petroleum sulfonate*

30 parts by weight of a mineral oil having a viscosity of 350 at 100° F. was added to 70 parts by weight of a sodium mahogany petroleum sulfonate having the following analyses:

| | |
|---|---|
| Percent water | 4.4 |
| Percent oil | 29.0 |
| Percent sodium sulfonate | 66.0 |
| Percent inorganic salt | 0.6 |
| | 100.0 |

The combined weight of the sodium sulfonate was 515. The sodium sulfonate-mineral oil mixture was then added to 170 parts by weight of petroleum thinner having a boiling range of 186° F. to 290° F. This whole mixture was washed with dilute aqueous sodium chloride to remove the sodium sulfate. Calcium mahogany petroleum sulfonate was prepared by emulsifying 76 parts by weight of a 10% aqueous solution of calcium chloride in the mineral-oil-sodium sulfonate blend. All inorganic salts were removed from the oil phase by water washes. The thinner and the water were removed by heating the mixture to a temperature of 320° F., at a pressure of 30 millimeters of mercury.

The mineral oil blend of neutral calcium mahogany petroleum sulfonate thus formed contained 1.75% calcium and 2.98% sulfur.

*Example II.—Preparation of calcium dialkyl benzene sulfonate*

The dialkyl benzene used in this example was obtained by alkylation of benzene with polypropylene having a molecular weight of about 170, using hydrofluoric acid as the catalyst. The dialkyl benzene stock (37 parts by weight) was treated with 48 parts by weight of 27% fuming sulfuric acid) after which the acid and sludge settled out and was discarded. The sulfonated material was neutralized with aqueous caustic soda. To this stock, 29 parts by weight of a mineral oil having a viscosity of 350 SSU at 100° F. was added.

The mineral oil blend of crude sodium dialkyl benzene sulfonate was dissolved in 80 parts by weight of petroleum thinner having a boiling range of 186 to 290° F., which solution was then washed with aqueous sodium chloride to remove the sulfate present. The sodium dialkyl benzene sulfonate was converted to the calcium dialkyl benzene sulfonate by metathesis resulting from the addition of 50 parts by weight of a 10% aqueous calcium chloride solution. The whole mixture was water washed to free the mixture of any residual inorganic salts. The thinner and the water were removed by heating the whole mixture to a temperature of 320° F. at a pressure of 30 millimeters of mercury.

The mineral oil blend of calcium dialkyl benzene sulfonate thus prepared contained 1.25% calcium and 2.25% sulfur.

The following Example III is representative of a preparation of a dispersion of calcium oxide in lubricating oil.

*Example III.—Stabilized colloidal dispersion of calcium oxide*

A mixture of 450 grams of a mineral oil solution of calcium mahogany petroleum sulfonate (the oil solution having 1.15% calcium), 6.7 grams of calcium oxide and 320 grams of ethylene glycol were heated together with stirring at a temperature of 300° F. for a period of 3 hours. The ethylene glycol was then removed by heating to a temperature of 320° F. at a pressure of 3 millimeters of mercury. The remaining mineral oil mixture was filtered. This filtered mineral oil solution contained 2.14% calcium, which showed the presence of 86% more calcium in the lubricating oil after the dispersion than before.

Further preparations of stable dispersions of polyvalent metal oxides and hydroxides are well illustrated by the data presented in Table I, which presents the reaction conditions and the analytical results of the final lubricating oil composition. Calcium mahogany petroleum sulfonate was the dispersing agent (the dispersant) used. Column 3 of Table I gives the amount of calcium in the lubricating oil solution prior to the dispersion, and column 8 gives the amount of calcium present in the lubricating oil solution after the dispersion and filtration. The dispersions were prepared by heating mineral oil solutions of calcium mahogany petroleum sulfonate and calcium oxide in the presence of ethylene glycol at a temperature ranging from 290 to 300° F. for periods ranging from 3 to 11 hours. The mineral oil solutions of calcium mahogany petroleum sulfonates were prepared according to the method illustrated by Example I.

In all the examples of Table I, ethylene glycol was used as the dihydric alcohol.

The following example illustrates the effectiveness of polyvalent metal naphthenates in stabilizing dispersions of polyvalent metal oxides and hydroxides in lubricating oils.

*Example IV.—Colloidal dispersions of calcium oxide in lubricating oil stabilized by calcium naphthenate*

A mixture of 370 grams of a mineral oil solution of calcium naphthenate (the oil solution having 2.57% calcium) and 130 grams of calcium oxide in ethylene glycol (the ethylene glycol solution contained 3.6% calcium) was heated to 380° F. for a period of 2 hours. Due to the increase in the viscosity an additional 100 grams of a mineral oil were added, and the mixture was heated for an additional period of 1 hour. The ethylene glycol was then removed by heating to a temperature of 450° F. at atmospheric pressure. The dispersion thus prepared contained 2.89% calcium, of which 2.02% was accounted for by the calcium in calcium naphthenate.

The following examples show the reduction of filtration time of dispersions by the use of alpha hydroxy acids.

*Example V.—Glycolic acid used to aid filtration*

A mixture of 130 parts by weight of ethylene glycol, 9.3 parts by weight of slaked lime containing 95% Ca(OH)$_2$, and 13.1 parts by weight of a 70% aqueous solution of glycolic acid in water was placed in a reaction vessel. These materials were agitated at room temperature under a nitrogen blanket for one hour, after which, 100 parts by weight of a California solvent-refined mineral oil and 100 parts by weight of a lubricating oil solution of neutral calcium sulfonate containing 1.64% calcium were added. The temperature of the mixture was then maintained at 320° F. for 3 hours, then at 375° F. for an additional 1⅔ hours to remove the ethylene glycol. At the end of this time the product was filtered at 320° F. through filter aid on a Buechner funnel, the filtration being completed in 4 minutes. The product contained 2.74% calcium.

In a duplicate run, identical in each step except that no glycolic acid was added, only 32 grams of product were filtered in 1 hour and 10 minutes. This filtrate contained 2.36% calcium.

*Example VI.—Lactic acid used to aid filtration*

A mixture of 130 parts by weight of ethylene glycol, 9.3 parts by weight of slaked lime containing 95% Ca(OH)$_2$, and 12 parts by weight of an 85% solution of lactic acid in water was placed in a reaction vessel. These materials were agitated at room temperature under a nitrogen blanket for one hour, after which, 100 parts by weight of a California solvent-refined mineral oil and 100 parts by weight of a lubricating oil solution of neutral calcium sulfonate containing 1.64% calcium were added. The temperature of the mixture was then maintained at 320° F. for 3 hours, then at 375° F. for an additional 1⅔ hours to remove the ethylene glycol. At the end of this time the product was filtered at 320° F. through filter aid on a Buechner funnel, the filtration being com-

TABLE I

| No. | Sulfonate Concentrate | | Grams CaO Used | Grams Solvent Used | Reaction Temp., °F. | Reaction Time, °F. | Percent Ca* |
|---|---|---|---|---|---|---|---|
| | Amount Used (Grams) | Percent Ca | | | | | |
| 1 | 800 | 1.31 | 15 | 400 | 300 | 3 | 2.52 |
| 2 | 700 | 0.86 | 20 | 400 | 300 | 8 | 2.36 |
| 3 | 800 | 0.55 | 21 | 400 | 300 | 3 | 1.90 |
| 4 | 300 | 1.17 | 6.5 | 120 | 290 | 4 | 2.52 |
| 5 | 300 | 1.17 | 6.5 | 60 | 290 | 4 | 2.44 |
| 6 | 300 | 1.17 | 6.5 | 30 | 290 | 4 | 2.30 |
| 7 | 300 | 1.17 | 6.5 | 15 | 290 | 4 | 2.28 |
| 8 | 500 | 1.75 | 12.5 | 0 | 300 | 20 | 1.77 |

*These figures pertain to the final amount of calcium present in the lubricating oil composition after the CaO was stably dispersed therein.

this time the product was filtered at 320° F. through filter aid on a Buechner funnel, the filtration being completed in 55 seconds. The product contained 3.0% calcium.

*Example VII.—Lactic acid used to aid filtration*

A mixture of 137 grams of ethylene glycol, 6.5 grams of calcium oxide and 11 grams of an 85% solution of lactic acid in water was stirred together at room temperature for one hour under a nitrogen blanket. 93 grams of a lubricating oil solution of neutral calcium sulfonate containing 1.64% calcium were added and the temperature was increased to 375° F. The ethylene glycol was stripped off at this temperature under a vacuum, and the product then filtered through filter aid on a heated Buechner funnel. This product, which filtered in 2 minutes, contained 5.6% calcium.

*Example VIII.—Lactic acid used to aid filtration*

A mixture of 168 parts by weight of ethylene glycol, 9.8 parts by weight of a commercial 95% Ca(OH)$_2$, and 12.5 parts by weight of an 85% solution of lactic acid in water was added to a 1-liter flask. After stirring at room temperature for one hour, 80 parts by weight of a California solvent-refined lubricating oil solution and 94 parts by weight of a lubricating oil solution of a neutral calcium sulfonate containing 1.64% calcium were added. The glycol was removed by stripping with a gentle stream of nitrogen under a vacuum at 375° F. This product, which filtered in 2 minutes, contained 3.4% calcium.

We claim:

1. In the process of preparing liquid lubricating oil compositions comprising forming an admixture of a lubricating oil, a dihydric alcohol, a dispersant, an inorganic substance selected from the group consisting of polyvalent metal oxides and hydroxides, removing dihydric alcohol, and filtering the remaining admixture, the improvement which comprises blending into said admixture, prior to the filtration step, a filtering agent in an amount such that the mol ratio of said filtering agent to said inorganic substance has a value from about 0.1 to about 4.0, wherein said filtering agent is selected from the group consisting of lactic acid, glycolic acid, and the calcium salts of these acids, said lubricating oil composition being substantially free of acid from said filtering agent.

2. The process of claim 1, wherein said filtering agent is lactic acid.

3. The process of claim 1, wherein said filtering agent is calcium lactate.

4. The process of claim 1, wherein said filtering agent is glycolic acid.

5. The process of claim 1, wherein said filtering agent is calcium glycolate.

References Cited in the file of this patent

UNITED STATES PATENTS

| | | |
|---|---|---|
| 2,285,453 | Merkle | June 9, 1942 |
| 2,470,913 | Bjorksten et al. | May 24, 1949 |
| 2,485,861 | Campbell et al. | Oct. 25, 1949 |

FOREIGN PATENTS

| | | |
|---|---|---|
| 518,593 | France | May 27, 1921 |